May 26, 1964     R. K. WENTZ     3,134,520
REGULATOR ASSEMBLY

Filed Sept. 28, 1961     2 Sheets-Sheet 1

RICHARD K. WENTZ
INVENTOR

BY *[signature]*
ATTORNEY

May 26, 1964   R. K. WENTZ   3,134,520
REGULATOR ASSEMBLY
Filed Sept. 28, 1961   2 Sheets-Sheet 2
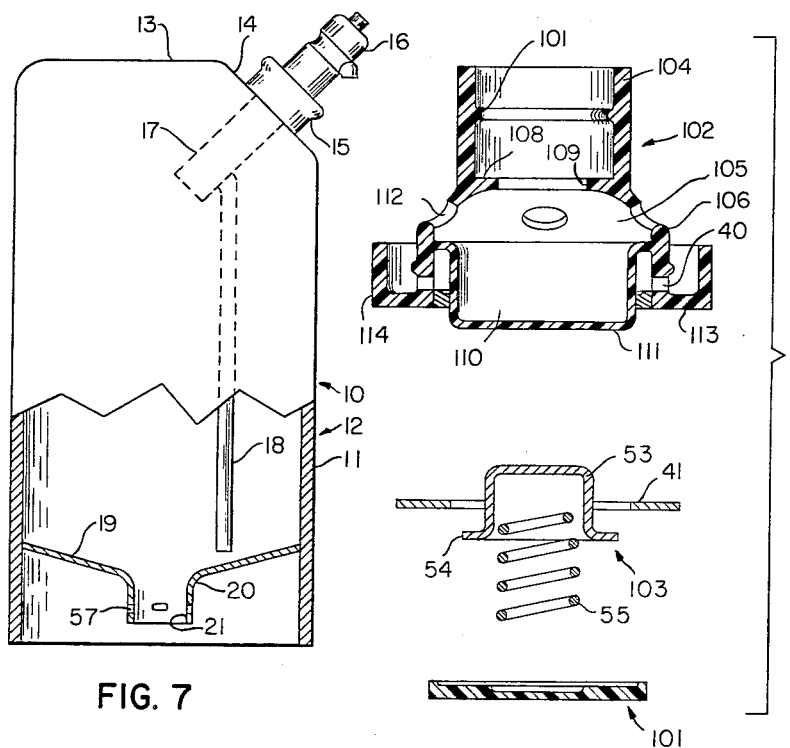
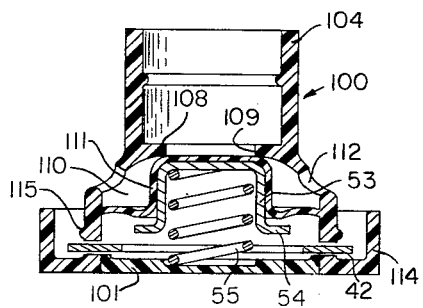
RICHARD K. WENTZ
INVENTOR
BY
ATTORNEY 3,134,520
REGULATOR ASSEMBLY
Richard K. Wentz, Towson, Md., assignor to Aircraft Armaments, Inc., Cockeysville, Md., a corporation of Maryland
Filed Sept. 28, 1961, Ser. No. 141,474
9 Claims. (Cl. 222—399)

This invention relates to detachable regulator assemblies for reusable pressurized containers, and more particularly to a regulator assembly which is operative to pressurize a container of the class described upon attachment of the assembly to the container.

Containers of the class described are used to market various fluent materials which a consumer can dispense, utilizing the pressure differential decreases to cause a movable diaphragm of the regulator assembly to move, under the action of a spring, against the decreasing internal pressure in the container until the diaphragm depresses a valve permitting it to meter high pressure gas from a reservoir on the assembly into the container until the internal pressure forces the diaphragm away from the valve. This action of the diaphragm serves to maintain the pressure differential at a substantially constant value as the contents are withdrawn.

One type of container of the class described now in use utilizes a regulator assembly that is internally mounted in the container, and is removable for inspection and cleaning. For many considerations, it is desirable to fill the reservoir portion of the regulator assembly prior to its insertion into the container. However, without the pressure on the opposite side of the diaphragm, the latter would maintain the valve of the reservoir in a depressed condition. Thus, it would not be possible to prevent high pressure gas in the reservoir from escaping prior to insertion of the assembly into the container.

It is therefore an object of this invention to provide a regulator assembly in which the diaphragm is prevented from depressing the valve on the reservoir until after the assembly is inserted into the container. It is a further object of this invention to provide a regulator assembly which is operative to pressurize a container upon attachment of the assembly to the container.

As a feature of this invention whereby the objects thereof are achieved, restrainer means in the form of a flange attached to the diaphragm is engageable with movable latch means in the form of a snap ring mounted on the assembly so that the diaphragm is spaced from the valve. Such latch means, when the assembly is inserted into the container, snaps into apertures therein accomplishing two things: (1) release of the diaphragm whereby it depresses the valve and pressurizes the container, and (2) attachment of the assembly to the container.

Still other objects, features and attendant advantages will become apparent to those skilled in the art from a reading of the following detailed description of several physical embodiments constructed in accordance with the invention, taken in conjunction with the accompanying drawings wherein:

FIGURE 7 shows a container with portions broken away into which the regulator assembly shown in FIGURES 1 through 6 can be inserted.

FIGURE 8 is an exploded view of another embodiment of a regulator assembly showing how the diaphragm is integrally cast with the holder for the pressure cylinder.

FIGURE 9 is an assembly of the embodiment shown in FIGURE 8.

Figure 1:
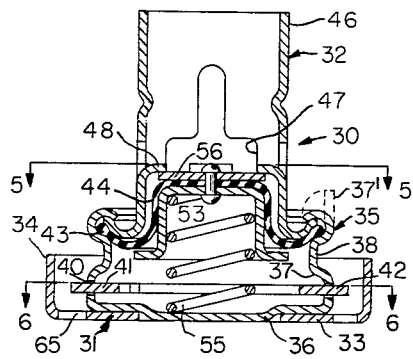
FIGURE 1 is a sectional side view of a part of the regulator assembly prior to the installation of a pressure cylinder.

Referring first to FIGURE 7, a reusable container of the class described is indicated generally at 10. Container 10 is rectangular in cross-section with vertical front and rear sheet metal walls 11 and 12. Top 13 is closed, and is provided with an inclined front panel 14 from which tube 15 projects. Faucet 16 is mounted in tube 15 and extends interior to the container as at 17. Tube 18 is attached to portion 17 of the faucet and extends to a point closely adjacent to bottom 19 of container 10.

Bottom 19 is provided with an outwardly-turned tubular portion 20 defining aperture 21 in the center of the bottom. Container 10 may be filled through aperture 21 when the container is inverted. After filling, regulator assembly 30 (see FIGURES 1 through 6) may be inserted in aperture 21. Assembly 30 closes the aperture 21 in the container permitting the latter to be pressurized.

Figure 6:
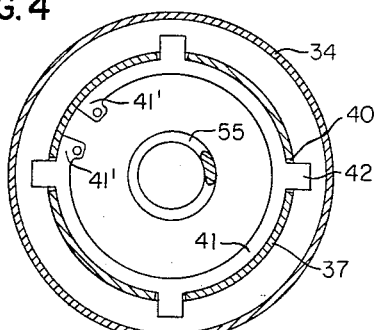
FIGURE 6 is a section along line 6—6 of FIGURE 1 showing the latch means.

Regulator assembly 30 comprises cap assembly 31 to which holder 32 is attached. Cap assembly 31 includes cap 33 having flange 34 which fits around and outside of tubular portion 20 on bottom 19. Assembly 31 also includes cup 35 attached by base 36 to cap 33. Cup 35 has upstanding tubular walls 37 of a diameter to slideably fit in aperture 21 of bottom 19. Walls 37 have indentation 38 within which O ring 39 is seated. Between indentation 38 and base 36, quadrantly spaced slots 40 are provided in walls 37 as shown best in FIGURE 6. Interior to walls 37 is latch means in the form of a snap ring 41 which is a circular member of resilient material with tangs 42 extending through slots 40 when the ring is in its expanded latched position. As shown in FIGURE 6, tangs 42 project beyond walls 37 when the ring is in its operative position.

The free edge of walls 37 is substantially normal to base 36 during the manufacturing of assembly 30 as can be seen at 37$^1$ in FIGURE 1. This permits peripheral edges 43 of the diaphragm 44 to rest on top of depression 38. On top of edges 43 of the diaphragm rests outwardly-turned flange 45 formed on sleeve 46 of holder 32. After flange 45 is positioned on edges 43 of the diaphragm, the free edge 37$^1$ can be crimped downwardly to securely retain the holder to the cap assembly.

Sleeve 46 is tubular with quadrantly-spaced notches 47. Each notch 47 is formed by severing a generally U-shaped piece from sleeve 46 to define on the sleeve, a tongue of metal 48 which is bent normal to the sleeve to form a stop for high pressure cylinder or cartridge 49 which is inserted into the sleeve with valve 50 facing diaphragm 44. Detents 51 formed in sleeve 46 resiliently retain cylinder 49 in contact with tongues 48 whereby valve 50 occupies a fixed axial position relative to snap ring 41. Notch 47 also is shaped to allow passage of gas valve from 49 to pass out of assembly into the container.

Valve 50 is of the type wherein the pressure in cylinder 49 and a spring (not shown) seat the valve. To valve the contents of cylinder 49, valve 50 must be depressed (see FIGURE 3). This type of valve is conventional and no further description thereof is thought to be necessary.

Attached to diaphragm 44 by rivet 52 is diaphragm restraining means in the form of a flanged cup 53. The base of this cup is adjacent the diaphragm and the remote ends of the cup are outwardly turned to form a holding flange 54. Flange 54 projects radially sufficiently far so that when free ends $41^1$ of snap ring 41 are squeezed together, flange 54 can be caught on the snap ring as shown best in FIGURE 2. Snap ring 41 is so constructed that tangs 42 are withdrawn from beyond the periphery of walls 37 when the ring catches flange 54 of holder 53. In the position shown in FIGURE 2, spring 55 biases diaphragm 44 toward valve 50, but is prevented from moving the diaphragm due to the restraining action of snap ring 41.

With the snap ring in its operative position, spring 55 biases diaphragm 44 to the position shown in FIGURE 1. Plate 56 attached to the diaphragm engages tongues 48 to limit movement of the diaphragm away from base 36. The diaphragm, including plate 56 and holder 53, can be moved toward base 36 and away from tongues 48 against the action of spring 55, and retained adjacent said base by squeezing together free ends $41^1$ of snap ring 41. This movement of the snap ring out of its operative position can be accomplished by applying radial inwardly directed forces to tangs 42. A suitable tool (not shown) inserted through tool openings 65 in cap 33 is used for this purpose.

Figure 2:
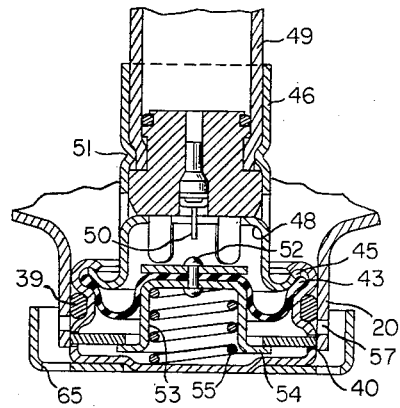
FIGURE 2 is a sectional view similar to FIGURE 1 with the pressure cylinder installed and the diaphragm of the regulator assembly held away from the cylinder valve by the latch means, the regulator assembly being inserted within a container.

With diaphragm 44 thus depressed, cylinder 49 filled with high pressure carbon dioxide can be inserted into sleeve 46 as shown in FIGURE 2 without any loss of any gas. Assembly 30 can now be inserted into aperture 21. O-ring 39 and diaphragm 44 form seal means which prevents leakage of the contents of container 10. During insertion of assembly 30, tubular portion 20 retains snap ring 41 out of its operative position whereby holder 53 prevents spring 55 from moving the diaphragm. When assembly 30 is properly inserted, tangs 42 align with quadrantly spaced apertures 57 in portion 20, whereupon the resiliency of the ring 41 causes the tangs to simultaneously snap into apertures 57 and release holder 53.

Figure 3:
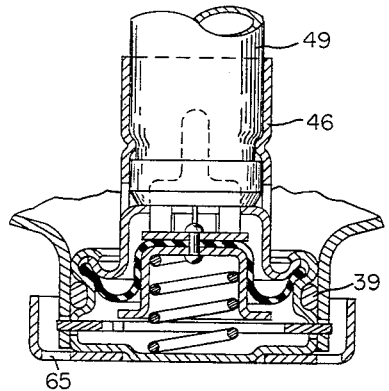
FIGURE 3 is a sectional view similar to FIGURE 1 but showing how movement of the latch means into a position which attaches the regulator assembly to the container releases the diaphragm and permits it to operate the valve of the pressure cylinder.
Figure 4:
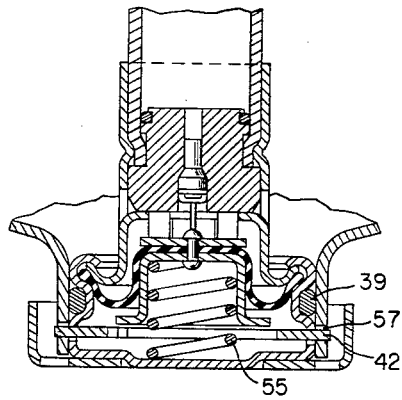
FIGURE 4 is a sectional view similar to FIGURE 3 and showing the equilibrium position of the diaphragm after sufficient gas from the pressure cylinder has been valved into the container to move the diaphragm away from the valve and prevent its operation.
Figure 5:
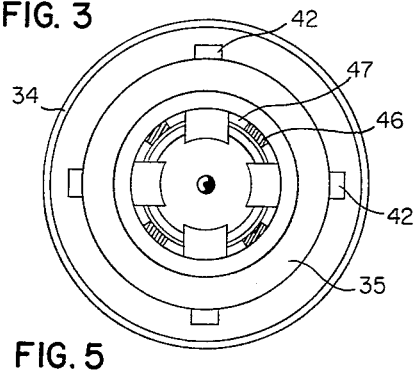
FIGURE 5 is a section along line 5—5 of FIGURE 1.

Diaphragm 44 is now free of restraint, and spring 55 moves the same away from base 36 until rivet 52 contacts valve 50 as shown in FIGURE 3. High pressure gas is then valved into the container causing the internal pressure to increase. Thus, one side of the diaphragm is exposed to the internal pressure and the other side is exposed to atmospheric pressure and the force exerted by spring 55. As the internal pressure builds up, diaphragm 44 moves against spring 55 away from the valve. With proper spring constants, the diaphragm will move away from the valve when the pressure is at some predetermined pressure in excess of atmospheric pressure. When a portion of the contents of the container is withdrawn through faucet 16, the decreased volume of fluent material causes the internal pressure to drop whereupon spring 55 again moves diaphragm 44 away from the base and rivet 52 into contact with valve 50. When the internal pressure rises to said predetermined value, the diaphragm is again forced away from the valve.

From the above description, it can be seen that a pressurized cylinder 49 can be inserted into sleeve 46 without the loss of any gas. Furthermore, gas is released into the container only after the regulator assembly is properly attached to the container.

To facilitate construction of the regulator assembly, the embodiment shown in FIGURES 8 and 9 can be utilized. As shown in these figures, regulator assembly 100 is molded from a suitable plastic material and consists of plug 101, holder 102, and diaphragm restrainer assembly 103. Holder assembly 102 has tubular portion 104 which flares outwardly at shoulder 105 to another tubular portion 106 larger than portion 104. Portion 104 has internal rib 107 which serves to locate cylinder 49 against web 108 at shoulder 105. The valve of a gas cylinder passes through aperture 109 in web 108 and projects into chamber 110 defined by shoulder 105, a portion of walls 106 and partition 111 integrally attached to walls 106 and formed during the molding operation.

Partition 111 is then integral and can be deformed from the molded position of FIGURE 8 to the position of FIGURE 9. The material of assembly 100 is sufficiently resilient to permit unlimited flexing of the partition. Quadrantly spaced openings 112 connect chamber 110 to the interior of the container when assembly 100 is attached to the container. Between the location where partition 111 is attached to wall 106 and the extremity of wall 106 are quadrantly spaced slots $40^1$ within which tangs 42 of snap ring 41 fit. The extremity of wall 106 is defined by flange 113 which is normal to the wall. Reverse flange 114 is attached to flange 113 so that portion 20 of bottom 19 fits wall 106 and flange 114.

The exterior of wall 106 is provided with a circumferential rounded projection 115 which forms a seal with tubular portion 20 when the assembly is inserted into aperture 21. Plug 101 is cemented or otherwise attached to the open end of tube 106 and provides a support for spring 55 which bears against holder 53. Spring 55 biases partition 111 away from plug 101 until it abuts web 108 as seen in FIGURE 9.

Flange 54 of holder 53 is engageable beneath retainer 41 when the latter is squeezed together as described above. When tangs 42 are aligned with slots 57, snap ring 41 snaps into operative position releasing flange 54 and permitting spring 55 to drive holder 53 away from plug 101. This moves partition 111 away from the plug until it strikes the valve of gas cylinder whereby the container is pressurized as above described. As the internal pressure builds up, partition 111 is pushed toward plug 101 and the valve is released.

By constructing partition 111 integral with holder assembly 102, a simple and economic way to produce a regulator assembly is achieved. Furthermore, as with the first-described embodiment, attachment of the regulator assembly to a container serves to pressurize the same.

What is claimed is:

1. The combination comprising a pressurizable container having a tubular portion defining an opening in the container, and a regulator assembly disposed in said opening; said regulator assembly comprising: a cap assembly having upstanding walls and a base, the walls of said assembly being engaged with the tubular portion of the container, movable latch means resiliently urged toward an operative position into engagement with said tubular portion for latching said assembly to said tubular portion, seal means for preventing the contents of said container from leaking out of the opening therein, said seal means including a flexible diaphragm attached at its periphery to said walls, said diaphragm being responsive to the pressure differential thereacross to move toward and away from said base, spring means acting on one side of said diaphragm to urge the same to a position remote from said base, a sleeve holder assembly including a cartridge containing a gas under pressure, said cartridge having valve means for releasing gas whenever said valve means is depressed, said sleeve holder assembly being attached to the walls of said cap with said valve means facing the other side of said diaphragm, said diaphragm when in the position remote from said base causing said valve means to be depressed and opened for increasing the pressure in said container until the increased pressure causes said diaphragm to move from its remote valve-opening position toward said cap and to release said valve means to closed position, and valve-operation-prevention means on said diaphragm for preventing said diaphragm from moving to valve opening position until after said latch means is in operative position.

2. A regulator assembly in accordance with claim 1 wherein said cap assembly is of molded plastic material and said flexible diaphragm is integral with said upstanding walls.

3. In combination, a pressurized container having a tubular portion defining an opening in the container; and a regulator assembly comprising a cap assembly covering said opening, latch means on said cap assembly movable from a latching position at which the latch means is engaged with said tubular portion and prevents removal of the cap assembly to an unlatched position at which the latch means is disengaged from said tubular portion and permits removal of the cap assembly, said latch means being resiliently urged toward latched position, a diaphragm attached to said cap assembly, a high pressure cartridge, said diaphragm having an effective region of limited movement in which it operates a cartridge valve to cause the contents of said cartridge to maintain a substantially constant pressure differential between the inside and the outside of the container, means on said diaphragm engageable with said latch means when the latter is held at unlatched position for holding said diaphragm out of said effective region whereby said regulator assembly can be attached to said container with said diaphragm held out of its effective region, and spring means urging said diaphragm to its effective region so that upon movement of said latch means from said unlatched position to said latching position latching said assembly to said container, said spring means is effective to move said diaphragm to its effective region.

4. In a dispenser having a pressurizable container with a tubular portion defining an opening in the container, and a regulator assembly disposed in said opening, said regulator assembly comprising: a cap assembly having upstanding walls and a base, the walls of said cap assembly being engaged with the tubular portion of the container and the base of said cap assembly covering the opening in the container, movable latch means resiliently urged toward a latching position in engagement with said tubular portion for latching said cap assembly to said tubular portion, seal means for preventing the contents of said container from leaking out of the opening therein, said seal means including a flexible diaphragm attached at its periphery to said walls, said diaphragm being responsive to the pressure differential thereacross by moving toward and away from said base, spring means acting on one side of said diaphragm to urge the same to a position remote from said base, a sleeve holder assembly including a cartridge, said cartridge having valve means for releasing the contents of the cartridge whenever said valve means is depressed, said sleeve holder assembly being attached to the walls of said cap so that said valve means faces the other side of said diaphragm, said diaphragm when in said remote position causing said valve means to be depressed and opened for increasing the pressure in said container until the increased pressure causes said diaphragm to move from its remote valve-opening position toward said cap and to release said valve means, and means on said diaphragm for preventing said diaphragm from moving away from said base until after said latch means is in latching position.

5. In a dispenser, a regulator assembly comprising: a pressure cylinder, a valve for valving the contents of said cylinder into a pressurized container, a diaphragm disposed adjacent said valve, means resiliently urging said diaphragm toward a position whereby it effects opening of said valve, said diaphragm being exposed to internal pressure within said pressurized container on one side thereof which internal pressure acts to resiliently urge said diaphragm toward a position which enables the valve to close, latch means resiliently urged from an unlatched position at which the regulator assembly is unlatched from said container to a latched position at which the regulator assembly is latched to said container, and restrainer means engageable with said latch means when the latter is at an unlatched position for preventing operation of said valve, said restrainer means being responsive to movement of said latch means from unlatched position to latched position to effect release of said diaphragm to valve-operating position.

6. In combination with a pressurized container having a tubular portion defining an opening in said container, a regulator comprising: a cap assembly having tubular walls engaged with the tubular portion of said container and having a base covering the opening of said container, movable latch means mounted on said cap assembly resiliently urged into latching engagement with said tubular portion for latching the assembly to the container, a flexible diaphragm attached to said tubular walls to seal the opening in the container and responsive to a pressure differential thereacross for moving toward and away from said base, spring means acting between said base and one side of said diaphragm to urge the latter away from said base, a pressurized gas cartridge having a valve which when depressed effects release of the gas from the cartridge and into said pressurized container, means mounting said cartridge so that said diaphragm opens the valve when the diaphragm is at a preselected displacement position relative to said base, latch-engageable means on said diaphragm engageable with said latch means when said latch means is held out of latching engagement with said tubular portion for retaining said diaphragm at less than said preselected displacement from said base whereby said assembly may be inserted into said tubular portion without the diaphragm depressing said valve, said latch-engageable means on said diaphragm being releasable from said latch means in response to movement of said latch means to latching engagement with said tubular portion whereby release of said latch means after said assembly is inserted into said tubular portion serves to substantially simultaneously latch said assembly to said container and permit movement of said diaphragm to said preselected displacement position under the influence of said spring for pressurizing said container.

7. The combination of claim 6 wherein said cap assembly is of molded plastic material and said flexible diaphragm is integral with said tubular walls.

8. The combination of claim 7 wherein said latch means is a snap ring which has a nominal outside diameter less than the inside diameter of said tubular portion of said container when said snap ring is an unstressed condition, and has a plurality of tangs that project radially therefrom, and wherein said tubular portion has mating slots therein with which said tangs are alignable and insertable.

9. Apparatus according to claim 5 wherein said diaphragm is open to ambient external pressure on the side thereof opposite said valve.

References Cited in the file of this patent
UNITED STATES PATENTS

| 2,659,629 | Graham | Nov. 17, 1953 |
| 2,812,109 | Wentz | Nov. 5, 1957 |
| 2,822,002 | Mack | Feb. 4, 1958 |

FOREIGN PATENTS

| 26,994 | France | Dec. 26, 1923 |